(12) United States Patent
Werner et al.

(10) Patent No.: US 10,298,364 B2
(45) Date of Patent: May 21, 2019

(54) GROUP-BASED RESOURCE ELEMENT MAPPING FOR RADIO TRANSMISSION OF DATA

(71) Applicant: Telefonaktiebolaget L M Ericsson (publ), Stockholm (SE)

(72) Inventors: Karl Werner, Segeltorp (SE); Johan Furuskog, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 115 days.

(21) Appl. No.: 14/416,435

(22) PCT Filed: Dec. 10, 2013

(86) PCT No.: PCT/EP2013/076057
§ 371 (c)(1),
(2) Date: Jan. 22, 2015

(87) PCT Pub. No.: WO2015/086044
PCT Pub. Date: Jun. 18, 2015

(65) Prior Publication Data
US 2016/0028513 A1  Jan. 28, 2016

(51) Int. Cl.
*H04L 5/00* (2006.01)
*H04W 72/04* (2009.01)

(52) U.S. Cl.
CPC .......... *H04L 5/0007* (2013.01); *H04L 5/0026* (2013.01); *H04L 5/0041* (2013.01);
(Continued)

(58) Field of Classification Search
CPC ... H04L 5/0041; H04L 5/0007; H04L 5/0026; H04L 5/0082; H04L 5/0023; H04L 5/0048; H04W 72/044
See application file for complete search history.

(56) References Cited

U.S. PATENT DOCUMENTS

| | | | |
|---|---|---|---|
| 2010/0215007 A1* | 8/2010 | Zhang | H04L 5/0007 370/329 |
| 2011/0206147 A1* | 8/2011 | Hariharan | H04L 1/08 375/260 |

(Continued)

FOREIGN PATENT DOCUMENTS

WO  2008115003 A2  9/2008
WO  2011056016 A2  5/2011
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical channels and modulation (Release 11)", Technical Specification, 3GPP TS 36.211 V11.4.0, Sep. 1, 2013, pp. 1-120, 3GPP, France.

(Continued)

*Primary Examiner* — Jackie Zuniga Abad
*Assistant Examiner* — Justin T Van Roie
(74) *Attorney, Agent, or Firm* — Coats & Bennett, PLLC

(57) ABSTRACT

For transmitting data over a radio interface using subframes with a plurality of resource elements organized in a time-frequency grid, at least two groups of resource elements are determined from the resource elements of one of the subframes. Each group covers multiple consecutive resource elements in the time domain and is distinct from the at least one other group in the frequency domain. Data symbols of a sequence are consecutively mapped to the resource elements of one of the groups. If a data symbol is mapped to each resource element of the group, the next data symbols of the sequence are consecutively mapped to the resource elements of a further one of the groups.

19 Claims, 15 Drawing Sheets

(52) U.S. Cl.
CPC ......... *H04L 5/0082* (2013.01); *H04W 72/044* (2013.01); *H04L 5/0023* (2013.01); *H04L 5/0048* (2013.01)

(56) References Cited

U.S. PATENT DOCUMENTS

| | | | | |
|---|---|---|---|---|
| 2013/0034070 A1* | 2/2013 | Seo | ................ | H04B 7/155 370/329 |
| 2013/0315178 A1* | 11/2013 | Lee | ................ | H04L 5/0007 370/329 |
| 2013/0343363 A1* | 12/2013 | Seo | ................ | H04B 7/12 370/336 |

FOREIGN PATENT DOCUMENTS

| | | | |
|---|---|---|---|
| WO | 2011132988 | A2 | 10/2011 |
| WO | 2013015607 | A2 | 1/2013 |

OTHER PUBLICATIONS

Qualcomm Europe, "UE RS Pattern for LTE-A", 3GPP TSG-RAN WG1 #58, Shenzhen, China, Aug. 24, 2009, pp. 1-9, R1-093105, 3GPP.

Ericsson, et al., "Further discussion on PRB bundling", 3GPP TSG-RAN WG1 #60bis, Beijing, China, Apr. 12, 2010, pp. 1-2, R1-101740, 3GPP.

\* cited by examiner

```
pipe_idx = 0
r=0 while pipe_idx < Npipes
    a=0 while a < Nprb*Nsc
        b = 0 while b < Nbundle(pipe_idx)
            c = ((a+b)*sc_step)mod(Nprb*Nsc)
            e = b*Npipes+(pipe_idx+Npipes-Nstart)mod(Npipes)
            s = 0 while s < 14
                if PDSCH_mask(c+e*Nprb*Nsc,s) > 1
                    p = 0 while p < Nlayers
                        sf_buf(c+e*Nprb*Nsc,s,p) = ap_buf(r,p)
                        p = p+1
                    end while p r = r+1
                else if PDSCH_mask(c+e*Nprb*Nsc,s) > 0
                    r = r+1 end if s = s+1
            end while s b = b+1
        end while b a = a+1
    end while a pipe_idx = pipe_idx+1
end while pipe_idx
```

FIG. 7

```
pipe_idx = 0
r=0 while pipe_idx < Npipes
   a=0 while a < Nprb*Nsc
      b = 0 while b < Nbundle(pipe_idx)
         e = b*Npipes+(pipe_idx+Npipes-Nstart)mod(Npipes)
         s = 0 while s < 14
            c = ((a+b+s)*sc_step)mod(Nprb*Nsc)

if PDSCH_mask(c+e*Nprb*Nsc,s) > 1
               p = 0 while p < Nlayers
                  sf_buf(c+e*Nprb*Nsc,s,p) = ap_buf(r,p)
                  p = p+1
               end while p r = r+1
            else if PDSCH_mask(c+e*Nprb*Nsc,s) > 0
               r = r+1 end if s = s+1
         end while s b = b+1
      end while b a = a+1
   end while a pipe_idx = pipe_idx+1
end while pipe_idx
```

FIG. 10

GROUP-BASED RESOURCE ELEMENT MAPPING FOR RADIO TRANSMISSION OF DATA

TECHNICAL FIELD

The present invention relates to methods for transmitting data over a radio interface using subframes with a plurality of resource elements organized in a time-frequency grid and to corresponding devices.

BACKGROUND

In cellular networks, it is known to assign resource elements of the available radio capacity to be used for data transmission to or from a user equipment (UE). Specifically, such resource elements may be organized in a time-frequency grid.

For example, the LTE (Long Term Evolution) radio technology specified by 3GPP (3rd Generation Partnership Project) uses Orthogonal Frequency Division Multiplexing (OFDM) for downlink (DL) transmissions to UEs and Discrete Fourier Transform (DFT) spread OFDM, also referred to as Single Carrier (SC) OFDM, for uplink (UL) transmissions from the UEs. In this case, the available resources may be organized in a time-frequency grid of subcarriers with 15 kHz width and time elements corresponding to the duration of one OFDM symbol. A resource element may then extend over one subcarrier in the frequency domain and the duration of one OFDM symbol in the time domain. Such a time-frequency grid may be defined individually for each antenna port.

In the time domain, LTE DL transmissions are organized in radio frames of 10 ms duration, each radio frame consisting of ten equally-sized subframes of 1 ms duration, also referred to as TTI (Transmission Time Interval). The subframes are in turn divided into two slots, each having 0.5 ms duration. Each subframe includes a number of OFDM symbols which may be used for conveying control information or data.

The resource allocation in LTE is accomplished on the basis of resource blocks. A resource block corresponds to one slot in the time domain and 12 contiguous subcarriers in the frequency domain. In LTE, the highest granularity level of assigning resource elements corresponds to two in time consecutive resource blocks, also referred to as a resource block pair or Physical Resource Block (PRB). A PRB thus extends over the entire time duration of the subframe. Dynamic scheduling may be performed in each subframe. For this purpose, an LTE base station, referred to as evolved Node B (eNB) may use a DL control channel, e.g., the Physical DL Control Channel (PDCCH) to transmit DL assignments and UL grants to the UEs served by the base station. The PDCCH is transmitted in the first OFDM symbol(s) of the subframe.

If an UE has decoded such DL assignment, it knows which time and frequency resources in the subframe contain DL data destined to the UE. Similarly, upon receiving an UL grant, the UE knows on which time/frequency resources it should transmit UL data. The DL data are carried by a channel which is shared by the UEs served by the base station and is referred to as Physical DL Shared Channel (PDSCH). Similarly, the UL data are carried by a channel which is shared by the UEs served by the base station and is referred to as Physical UL Shared Channel (PUSCH).

In the above-mentioned LTE radio technology, but also in other radio access technologies, demodulation and decoding of sent data typically requires estimation of a propagation characteristic of the radio channel. This may be accomplished by using transmitted reference symbols (RS), i.e., symbols known by the receiver. In the LTE radio technology, cell specific RS (CRS) are transmitted in all DL subframes. Besides their usage for DL channel estimation, they may also be used for mobility measurements performed by the UEs. In addition, also UE specific RS (also referred to as DMRS) may be used.

To allow for more efficient channel estimation, the LTE radio technology also provides a concept referred to as physical resource block (PRB) bundling. In these concepts, a group of frequency consecutive PRB pairs within a subframe are grouped to a PRB bundle. For such PRB bundle, the receiver can assume that precoding at the transmitter remains static so that the DMRS are not significantly affected. This allows the receiver to perform channel estimation by averaging over the DMRS of the entire PRB bundle, rather than just a PRB pair.

A basic unit of transmission in the LTE radio technology is the transport block. In each TTI, one or two transport blocks may be transmitted to each scheduled user. Reception of a transport block may either succeed or fail.

Each transport block is divided into one or more code blocks. Each code block is separately encoded by the transmitter and decoded by the receiver using an error correcting (channel) code. If a code block is not decoded without errors, the reception of the entire transport block to which the code block is associated is considered as failed. In such case, a retransmission of the entire transport block is triggered.

The system selects several parameters associated with the transmission of a transport block. These parameters include modulation and coding scheme (MCS), code-rate as well as the number of spatial streams, or layers, onto which the transport block should be mapped. The selection of these parameters allows for achieving a trade-off between transmission reliability and efficiency of resource usage, as selecting the parameters too conservatively may lead to over-use of radio-resources while selecting them too aggressively may lead to failed reception of the transport block. The system may dynamically set the parameters to achieve that only a small portion of the received transport blocks fails to be decoded. The parameters can however only set with the granularity of a transport block. Adjusting the parameters between two code blocks within the same transport block is not possible. A reliable transmission of a transport block therefore requires a minimum decoding performance for each code block within the transport block. If one code block does not meet this minimum requirement, the transmission of the entire transport block fails, even if other code blocks have a significantly better decoding performance.

In the LTE radio technology, the code blocks are mapped onto the resource elements consecutively symbol by symbol in a frequency-first manner, over increasing subcarrier indices starting with the first OFDM symbol after the control region and successively continuing over all OFDM symbols in the subframe, as for example specified in 3GPP TS 36.211 V11.3.0 (2013-06). That is to say, the next available OFDM symbol on the time axis is only selected after for the present OFDM symbol all subcarriers allocated to a certain UE have been mapped. This allows for assuming that every code block is subjected to similar channel conditions. Further, this allows for starting decoding of the code blocks already before the entire subframe is received.

Two fundamental functions that need to be performed by an LTE receiver are channel estimation and MIMO (Multiple Input/Multiple Output) equalization. These functions require a significant amount of arithmetic operations. Accordingly, it is beneficial to distribute these functions over several parallelization instances that in turn map to digital signal processors, software threads, or hardware accelerators. This parallelization may be accomplished in such a way that each parallelization instance processes data that relates to a specific part of the received bandwidth. That is to say, the parallelization may be performed in the frequency domain. Further, the parallelization may consider the PRB bundles, so that each PRB bundle is assigned to only one parallelization instance. This facilitates the implementation of channel estimation and MIMO equalization.

Parallelization of the decoding process is however more complex. In particular, the above-described mapping may cause a code block to be distributed over resource elements which are located in different PRB bundles and therefore handled by different parallelization instances performing channel estimation and MIMO equalization. Decoding of the code block therefore requires information from these different parallelization instances, which means that the decoding task cannot be straightforwardly assigned to one of these parallelization instances.

Further, due to the above-described mapping of the code blocks to the resource elements it may occur that one code block is mapped to a relatively small contiguous part of the allocated bandwidth. This is specifically true when using a large number of MIMO layers, e.g., more than four, and/or a high-order MCS, which means that more data symbols can be mapped to the same subcarrier. This is not optimal from a frequency diversity point of view, and may adversely affect the decoding performance. Further, if the channel quality varies over frequency this also causes some code blocks to experience worse channel conditions than others. As mentioned above, this may result in failed transmission of the entire transport block.

Further, problems may occur if a given OFDM symbol encounters broadband-interference, e.g., due to CRS transmission in a neighboring cell. In such cases, multiple data symbols would be affected simultaneously due to the code block being very localized in the time domain. This typically makes decoding impossible. For other code blocks, which are transmitted on another OFDM symbol, the broadband interference may be absent, which then causes a severe imbalance in the decoding performance of the code blocks. Similar considerations apply when certain OFDM symbols are intentionally punctured.

Still further, problems may occur in connection with the HARQ (Hybrid Automatic Repeat Request) mechanism utilized by the LTE radio technology, which has a tendency to map the code blocks of a retransmitted transport block to the same resource elements of the subframe which were also used for the failed initial transmission, provided that the PRB allocation to the UE is the same for the initial transmission and the retransmission. Accordingly, there is an increased likelihood that the retransmission fails for the same reasons as the initial transmission.

Moreover, the mapping of code blocks to resource elements as used in the LTE radio technology has the effect that one code block may span over several consecutive PRB bundles. If parallelization of the channel estimation and MIMO equalization is implemented as described above on a PRB bundle basis, the output from multiple parallelization instances is needed for decoding the code block, which significantly complicates decoding.

Accordingly, there is a need for techniques which allow for efficient transmission of data transmission over a radio interface using subframes with a plurality of resource elements organized in a time-frequency grid.

SUMMARY

According to an embodiment of the invention, a method of sending data over a radio interface using subframes with a plurality of resource elements organized in a time-frequency grid is provided. According to the method at least two groups of resource elements are determined from the resource elements of one of the subframes. Each group covers multiple consecutive resource elements in the time domain and is distinct from the at least one other group in the frequency domain. Further, data to be sent are processed to obtain a sequence of data symbols. This processing may for example comprise encoding of the data. The data symbols of the sequence are consecutively mapped to the resource elements of one of the groups. If a data symbol is mapped to each resource element of the group, the next data symbols of the sequence are consecutively mapped to the resource elements of a further one of the groups.

According to a further embodiment of the invention, a method of receiving data over a wireless interface using subframes with a plurality of resource elements organized in a time-frequency grid is provided. According to the method, one of the subframes is received. At least two groups of resource elements are determined from the resource elements in the subframe. Each group covers multiple consecutive resource elements in the time domain and is distinct from the at least one other group in the frequency domain. In accordance with a mapping of data symbols to the groups of resource elements, at least one sequence of data symbols received in the resource elements of the groups is determined. The data symbols of the sequence are processed to obtain received data. This processing may for example comprise decoding of the data symbols.

According to a further embodiment of the invention, a device for sending data over a radio interface using subframes with a plurality of resource elements organized in a time-frequency grid is provided. The device comprises an interface for sending the subframes over the radio interface. Further, the device comprises at least one processor. The at least one processor is configured to determine, from the resource elements of one of the subframes, at least two groups of resource elements. Each group covers multiple consecutive resource elements in the time domain and is distinct from the at least one other group in the frequency domain. Further, the at least one processor is configured to process data to be sent to obtain a sequence of data symbols. This processing may for example comprise encoding of the data. Further, the at least one processor is configured to consecutively map the data symbols of the sequence to the resource elements of one of the groups and, if a data symbol is mapped to each resource element of the group, consecutively map the next data symbols of the sequence to the resource elements of a further one of the groups.

According to a further embodiment of the invention, a device for receiving data over a radio interface using subframes with a plurality of resource elements organized in a time-frequency grid is provided. The device comprises an interface for receiving the subframes over the radio interface. Further, the device comprises at least one processor. The at least one processor is configured to receive one of the subframes and determine at least two groups of resource elements from the resource elements of the subframe. Each group covers multiple consecutive resource elements in the time domain and is distinct from the at least one other group in the frequency domain. Further, the at least one processor is configured to determine, in accordance with a mapping of data symbols to the groups of resource elements, at least one sequence of data symbols received in the resource elements of the groups. Further, the at least one processor is configured to process the data symbols of the sequence to obtain received data. This processing may for example comprise decoding of the data symbols.

According to a further embodiment of the invention, a computer program or computer program product, e.g., in the form of a non-transitory storage medium, is provided, which comprises program code to be executed by at least one processor of a device for sending data over a radio interface using subframes with a plurality of resource elements organized in a time-frequency grid. Execution of the program code causes the at least one processor to determine, from the resource elements of one of the subframes, at least two groups of resource elements. Each group covers multiple consecutive resource elements in the time domain and is distinct from the at least one other group in the frequency domain. Further, execution of the program code causes the at least one processor to process data to be sent to obtain a sequence of data symbols. This processing may for example comprise encoding of the data. Further, execution of the program code causes the at least one processor to consecutively map the data symbols of the sequence to the resource elements of one of the groups and, if a data symbol is mapped to each resource element of the group, consecutively map the next data symbols of the sequence to the resource elements of a further one of the groups.

According to a further embodiment of the invention, a computer program or computer program product, e.g., in the form of a non-transitory storage medium, is provided, which comprises program code to be executed by at least one processor of a device for sending data over a radio interface using subframes with a plurality of resource elements organized in a time-frequency grid. Execution of the program code causes the at least one processor to receive one of the subframes and determine at least two groups of resource elements from the resource elements the subframe. Each group covers multiple consecutive resource elements in the time domain and is distinct from the at least one other group in the frequency domain. Further, execution of the program code causes the at least one processor to determine, in accordance with a mapping of data symbols to the groups of resource elements, at least one sequence of data symbols received in the resource elements of the groups. Further, execution of the program code causes the at least one processor to process the data symbols of the sequence to obtain received data. This processing may for example comprise decoding of the data symbols.

BRIEF DESCRIPTION OF THE DRAWINGS

FIG. 7 shows exemplary pseudo code for implementing a resource element mapping process according to an embodiment of the invention.

FIG. 10 shows exemplary pseudo code for implementing a further resource element mapping according to an embodiment of the invention.

DETAILED DESCRIPTION OF EMBODIMENTS

In the following, concepts according to embodiments of the invention will be explained in more detail by referring to the accompanying drawings. The illustrated concepts relate to transmission of data over a radio interface which uses a subframe with resource elements organized in a time-frequency grid. Specifically, it is assumed that the radio interface is based on the LTE radio technology. The following explanations refer to scenarios of DL data transmission, which are based on the OFDM transmission mode of the LTE radio technology. However, it is to be understood, that the concepts could be applied in a corresponding manner to scenarios of UL data transmission, which are based on the DFT spread OFDM transmission mode of the LTE radio technology. Further, it is to be understood that the concepts could also be applied on the basis of other radio technologies in which resource elements are organized in a time-frequency grid.

Figure 1:
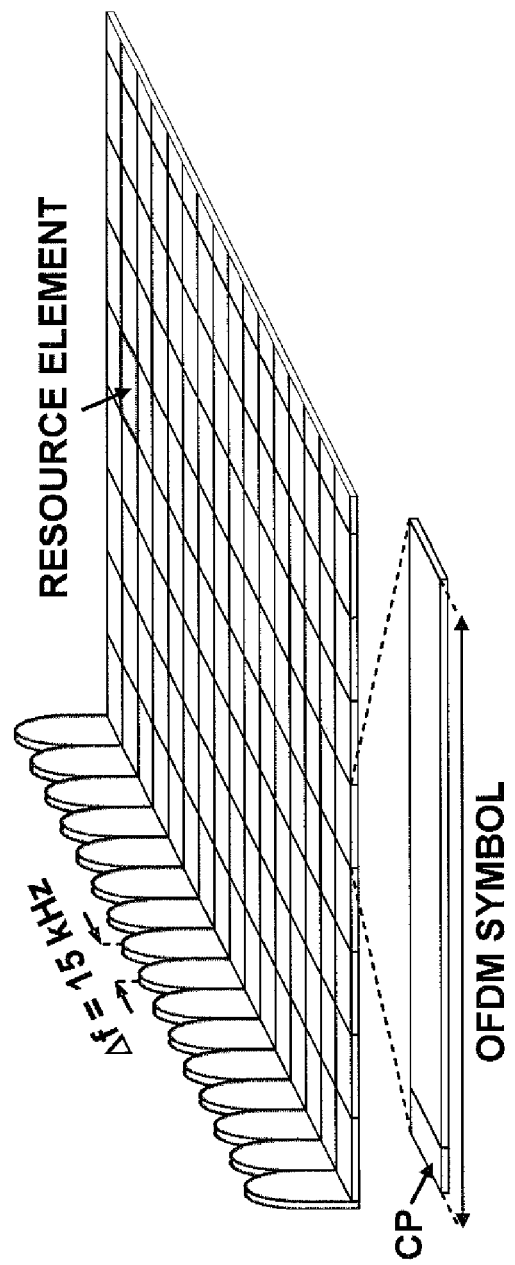
FIG. 1 schematically illustrates a subframe organized in a time-frequency grid as used in an embodiment of the invention.

FIG. 1 schematically illustrates the time-frequency grid. As illustrated, the time-frequency grid comprises a plurality of resource elements which correspond to one subcarrier of 15 kHz width in the frequency domain and a time slot having the duration of one OFDM symbol. As further illustrated, the OFDM symbols may each include a cyclic prefix (CP). In the following explanations, the OFDM symbols are assumed to be designated by an index $s=0, 1, 2, \ldots$ which increases with the time domain position of the OFDM symbol. In other radio technologies, a different time-frequency grid could be used, e.g., using another width of the subcarriers. Further, also other multiplexing schemes than OFDM could be utilized.

Figure 2:
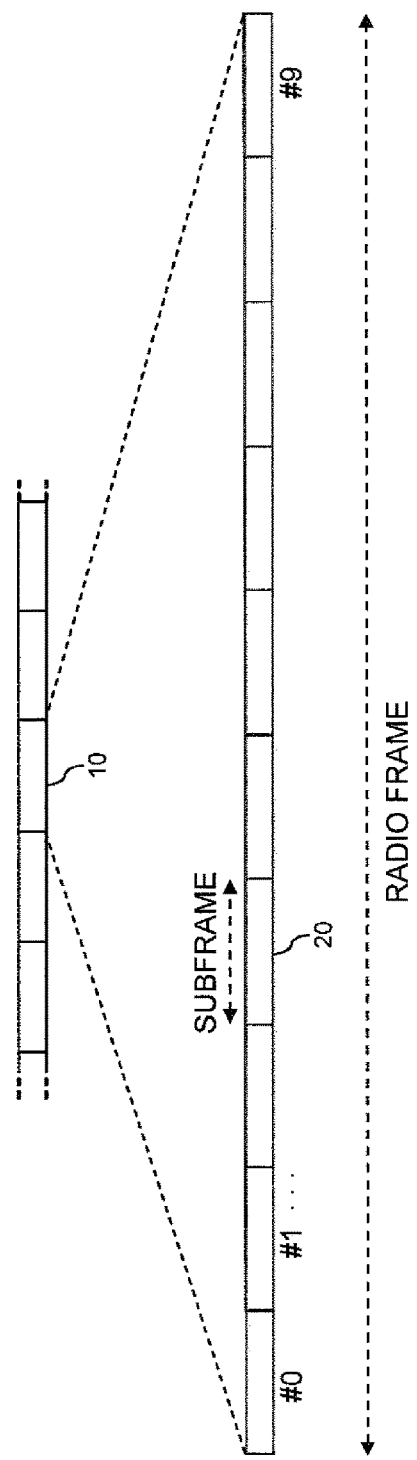
FIG. 2 schematically illustrates a radio frame comprising a sequence of subframes as used in an embodiment of the invention.

The time-domain structure of DL transmissions over the radio interface is illustrated in FIG. 2. As illustrated, the DL transmissions are organized in a sequence of radio frames 10 which each include a number of subframes 20. In accordance with the LTE specifications, it is assumed that the duration of a radio frame 10 is 10 ms and the duration of a subframe is 1 ms, which means that the radio frames 10 each consist of ten subframes. In other radio technologies, the time-domain structure of transmissions may be organized in a different manner, e.g., using different durations of the radio frame 10 and/or of the subframes 20.

Scheduling of DL transmissions to a UE is assumed to be accomplished at the level of PRBs formed, e.g., in units of blocks of resource elements which extend substantially over the entire time-domain duration of the subframe and 12 contiguous subcarriers in the frequency domain. However, the resource elements of a subframe which are allocated to individual UEs by scheduling may exclude a control region of the subframe, which may extend over the first OFDM symbols of the subframe, e.g, OFDM symbols 1-3 like specified for the LTE radio technology. For the sake of clarity, the following explanations focus on the resource elements of the subframe which can be allocated to UEs by scheduling.

Still further, the radio interface is assumed to support PRB bundling, e.g., as specified for the LTE radio technology. Accordingly, the PRBs of a subframe may be grouped to PRB bundles which are contiguous in the frequency domain. For example, of a PRB bundle of two PRBs would extend over 24 contiguous subcarriers in the frequency domain. For such a PRB bundle, a receiver may assume that precoding of reference symbols is static, which facilitates channel estimation on the basis of the precoded reference symbols, e.g., by allowing for averaging of measurements over multiple reference symbols transmitted in the same PRB bundle.

Moreover, the radio interface may also support spatial layering using multiple antennas in a MIMO configuration.

Figure 3:
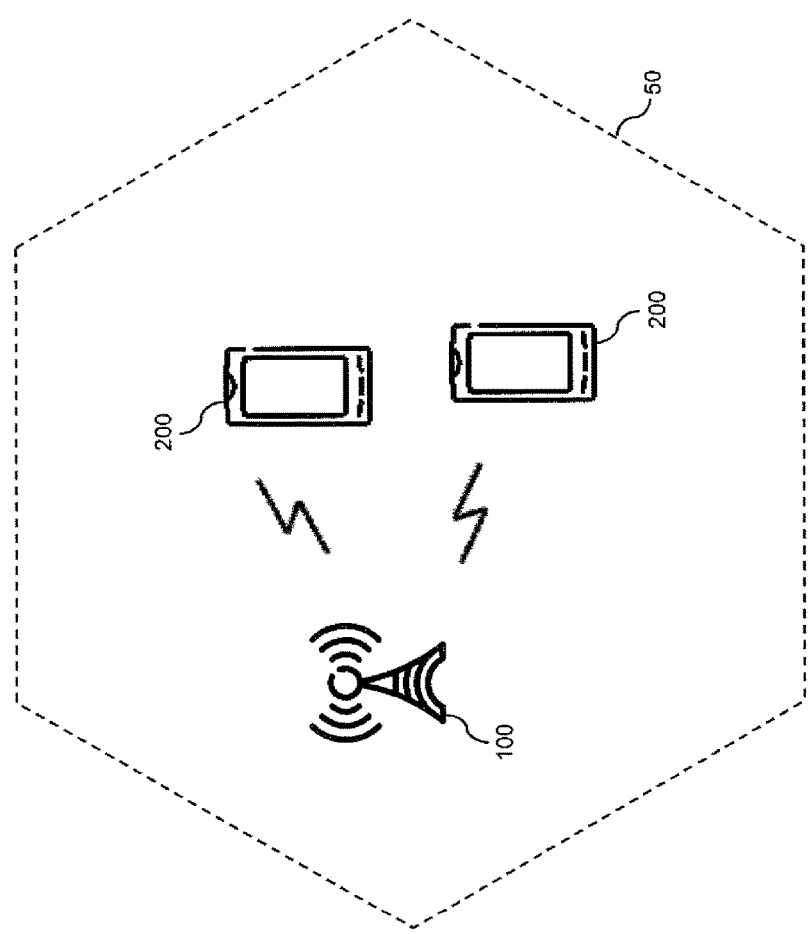
FIG. 3 schematically illustrates a cellular network environment for implementing data transmission according to an embodiment of the invention.

FIG. 3 illustrates an exemplary cellular network environment in which the concepts may be applied. Specifically, a cell 50 of the cellular network is illustrated which is served by a base station 100. Using the terminology as established for the LTE radio technology, the base station 100 may also be referred to as "evolved Node B" (eNB). In the cell 50, a plurality of UEs 200 may be served. For this purpose, the resource elements in the subframes 20 may be allocated to the individual UEs 200 by a scheduling mechanism, e.g., implemented at the base station 100. As mentioned above, this scheduling is assumed to be accomplished with a granularity of PRBs or groups of PRBs. If PRB bundling is used, such group of PRBs may correspond to a PRB bundle. That is to say, one or more of the PRBs (or PRB bundles) of the subframe may be allocated to a specific UE 200, thereby providing each UE 200 with its individual allocated bandwidth. This allocated bandwidth may be contiguous in the frequency domain, i.e., consist of multiple adjacent PRBs or multiple adjacent PRB bundles. However, the allocated bandwidth of a specific UE 200 could also consist of multiple PRBs or PRB bundles of which at least some are non-adjacent.

The transmission of data using the subframes 20 from a sender to a receiver, e.g., from the base station 100 to one of the UEs 200, is assumed to involve processing the data to be transmitted at the sender to obtain a sequence of data symbols, mapping the data symbols of the sequence to the resource elements of a given subframe 20, sending the subframe over the radio interface, receiving the subframe 20 at the sender, reconstructing the sequence of data symbols according to the mapping as used at the sender, and processing the data symbols of the reconstructed sequence to obtain the received data. The processing of the data at the sender may in particular include encoding of the data to be sent, and the processing of the data at the receiver may in particular include decoding of the received data symbols. This typically has the effect that the sequence of data symbols as transmitted in the subframe includes multiple code blocks. The characteristics of the code blocks depend on the configuration of the utilized code, e.g., a turbo code. Typically, each code block includes redundant information which may be utilized at the receiver to successfully decode the code block, even if one or more data symbols of the code block are not correctly received. However, further processing steps at the sender and/or receiver may be present as well. For example, the sender may segment the data to be sent into transport blocks, perform rate matching, modulation, scrambling, and/or mapping of the data symbols to spatial layers. Similarly, the receiver may perform channel estimation on the basis of the reference symbols in the subframe, weight computation, MIMO equalization, softbit extraction, descrambling, and/or rate dematching.

Figure 4:
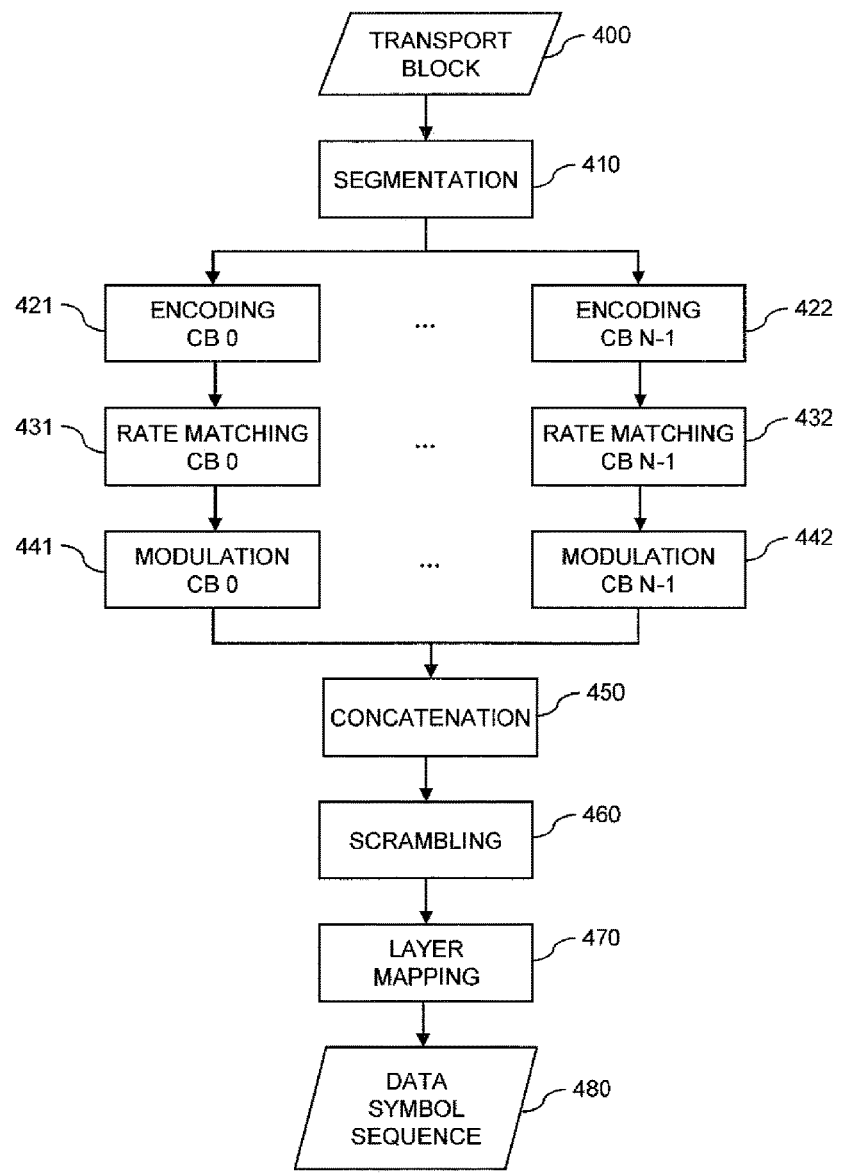
FIG. 4 schematically illustrates a process according to an embodiment of the invention, which may be used for obtaining a sequence of data symbols from data to be sent.

FIG. 4 illustrates an exemplary process which may be implemented by the sender for obtaining a sequence of data symbols to be sent. For example, the process steps of FIG. 4 may be implemented by one or more processors of the sender. For this purpose, the processor(s) may execute correspondingly configured program code. Further, at least some of the corresponding functionalities may be hardwired in the processor(s).

At step 400, a transport block to be sent is provided as input to the process. The transport block may for example be provided by a higher layer of the utilized protocol stack.

At step 410, the transport block may be segmented to be processed in multiple processing chains. Specifically, the process of FIG. 4 assumes parallelized encoding of the transport block.

The encoding is accomplished at steps 421, 422, using N separate encoders, e.g., operating on the basis of a turbo code. However, other types of codes could be utilized as well, e.g., a low density parity check code (LDPC). The separate encoders output N code blocks, designated as code block 0, . . . , N−1. The code blocks are individually decodable, which means that decoding of a certain code block typically does not require bits from other code blocks.

At steps 431, 432, the code blocks are subjected to rate matching, and at steps 441, 442, the code blocks are fed to a modulation process, which outputs a sequence of modulated data symbols for each code block.

At step 450, the sequences of modulated data symbols for the different code blocks are concatenated to obtain an overall sequence of data symbols for all code blocks of the transport block.

At step 460, the sequence of data symbols may further be subjected to scrambling, and at step 470 mapping of the data symbols to spatial layers may be performed.

The output of the process at step 480 is a sequence of data symbols for each spatial layer.

Figure 5:
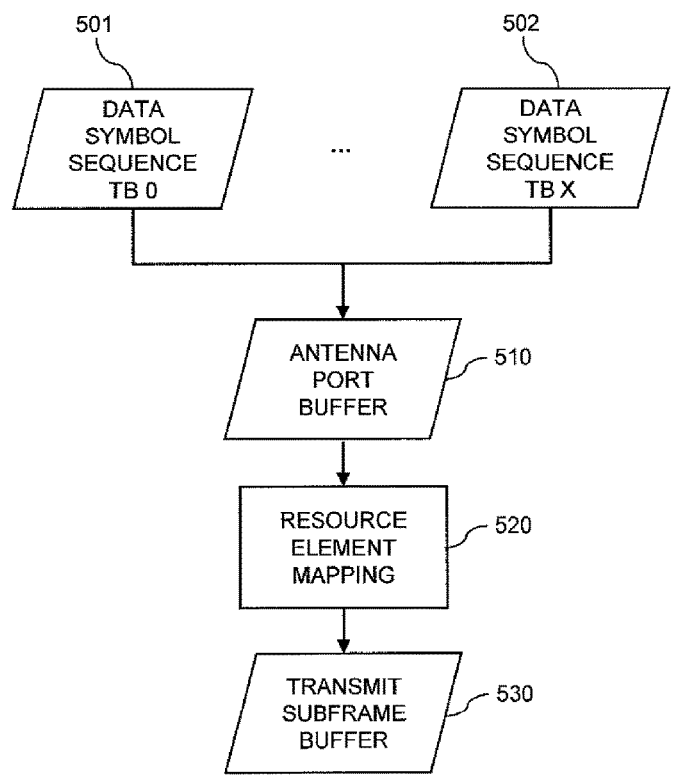
FIG. 5 schematically illustrates further processing the sequence of data symbols according to an embodiment of the invention.

The process of FIG. 5 may be used for further preparation of sending the transport block in one of the subframes 20. The process steps of FIG. 5 may be implemented by one or more processors of the sender. For this purpose, the processor(s) may execute correspondingly configured program code. Further, at least some of the corresponding functionalities may be hardwired in the processor(s).

As illustrated by steps 501, 502, the process of FIG. 5 may receive multiple sequences of data symbols, corresponding to multiple different transport blocks designated as TB 0, . . . , TB X, as input. Each of these data symbol sequences may have been obtained by the process of FIG. 4, using multiple instances of the process in parallel or by using the same instance of the process in sequence.

At step 510, the data symbol sequences are provided to an antenna port buffer. Here, a direct mapping of spatial layers to antenna ports may be assumed. That is to say, an antenna port buffer is provided for each spatial layer.

For the sake of simplicity, it can be assumed that the antenna port buffer stores the data symbol sequence of one transport block at a time. However, if the same subframe 20 is used for transmitting multiple transport blocks to the same UE 200, the antenna port buffer could also store the data symbol sequences of multiple transport blocks in parallel. The sequence of data symbols in the antenna port buffer is in the following designated as $y^{(p)}(i)$, wherein p is an index corresponding to the antenna port or spatial layer, and i is an index consecutively numbering the data symbols.

At step 520, the data symbols of the sequence are mapped to the allocated resource elements of the subframe 20. This mapping will be further discussed below.

As illustrated by step 530, the output of the process is a subframe buffer, which may be defined as a multidimensional array of the allocated resource elements with associated data symbol values. A first dimension of the array may correspond to the subcarrier (i.e., frequency dimension, a second dimension of the array may correspond to the OFDM symbol (i.e., time dimension), and a third dimension of the array may correspond to the antenna port or spatial layer (i.e., spatial dimension).

The subframe which is generated in accordance with the content of the subframe buffer is then transmitted over the radio interface.

Figure 6:
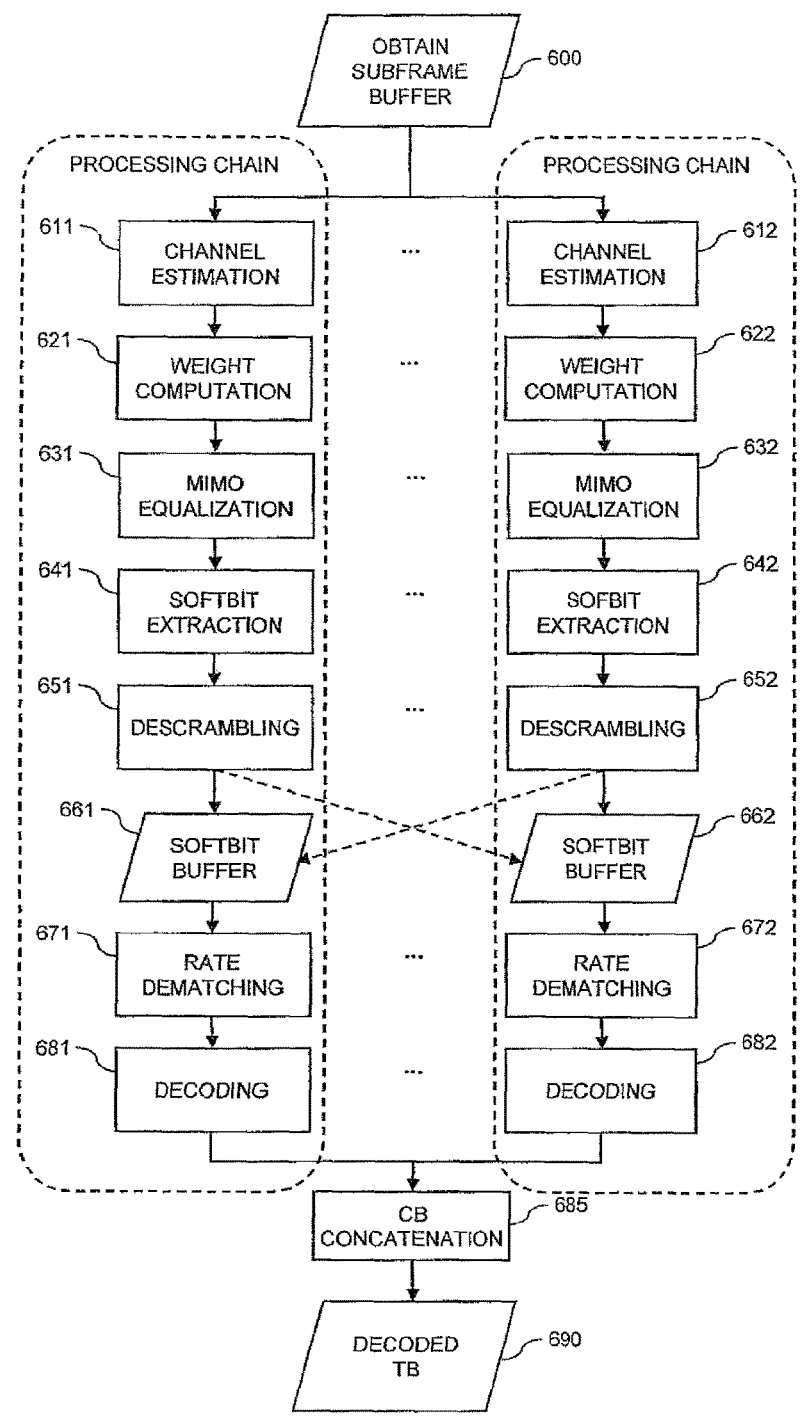
FIG. 6 schematically illustrates a process according to an embodiment of the invention, which may be used for processing a received subframe.

FIG. 6 illustrates an exemplary process of which may be implemented by the receiver for obtaining data, i.e., a transport block, from a received subframe. For example, the process steps of FIG. 6 may be implemented by one or more processors of the sender. For this purpose, the processor(s) may execute correspondingly configured program code. Further, at least some of the corresponding functionalities may be hardwired in the processor(s). In the following it is assumed that the process of FIG. 6 is used to receive a transport block which was transmitted using the processes of FIGS. 4 and 5.

At step 600, the subframe buffer is obtained from the received subframe. As illustrated, the subframe buffer may then be fed to multiple parallel processing chains. For example, each processing chain may be responsible for processing the resource elements of a group of PRB bundles.

As illustrated the processing may include channel estimation (steps 611, 612), weight computation (steps 621, 622), MIMO equalization (steps 631, 632), softbit extraction (steps 641, 642), descrambling (steps 651, 652) to obtain a softbit buffer 661, 662 as an intermediate output of each processing chain.

As further illustrated, the processing may continue from the softbit buffers 661, 662 by performing rate dematching (steps 671, 672) and decoding (steps 681, 682). The code utilized in steps 681, 682 corresponds to the code used for encoding at steps 421, 422, e.g., a turbo code.

At step 685, the data symbol sequences obtained from the decoding of individual code blocks at steps 681, 682 are concatenated to obtain the overall sequence of data symbols corresponding to the transport block as output of the process, as illustrated by step 690.

As illustrated by dotted arrows in FIG. 6, exchange of information between the different processing chains may be needed. In particular, if the same code block is processed in multiple processing chains for example soft bit values may need to be exchanged between the processing chains.

The concepts as illustrated herein relate to the mapping of the data symbols to the resource elements of the subframe 20, e.g., as used in step 520 of FIG. 5 and as used for feeding the data symbols received in the subframe to the processing chains of FIG. 6. In particular, the mapping as described herein may be used to provide reliable and efficient transmission of data and to facilitate parallel processing of the received subframe 20 at the receiver, e.g., by using processing chains as illustrated in FIG. 6.

The resource element mapping of the illustrated concepts is based dividing the allocated bandwidth of the UE 200 into groups of resource elements which include multiple consecutive resource elements in the time domain and are distinct in the frequency domain. Starting from a first group, the data symbols of the sequence are consecutively mapped to the resource elements of the group until all resource elements of the group have been mapped. Then the next data symbols of the sequence are mapped to the resource elements of the next group, and so on. In this way, the data symbols of the sequence are spread over the allocated bandwidth. Specifically, it can be avoided that the consecutive data symbols of a code block are mapped to a number of resource elements of the same OFDM symbol which are contiguous in the frequency domain.

In exemplary implementations which will be described in detail below, the groups of resource elements each include PRB bundles. These groups will in the following also be referred to as pipes. Since the groups are distinct, the association of the PRB bundles to the groups is unique, i.e., each PRB bundle is in only one group.

In the mapping of the illustrated implementations, the data symbols $y^{(p)}(i)$ associated with each antenna port are consecutively mapped to the subframe buffer, beginning with the first pipe of the subframe buffer, until all resource elements associated with the first pipe are mapped, then continuing with the second pipe. Depending on the number of pipes, this process may be continued until all pipes are completely mapped.

The grouping may be subframe dependent, i.e., differ from subframe to subframe. This may for example have beneficial effects for retransmissions of transport blocks. Specifically, the mapping may provide that the retransmission of a certain transport block is mapped to different resource elements of the allocated bandwidth than the initial transmission of the transport block. This allows for introducing time diversity to stationary channels.

In some implementations, the transmission of data may be based on a Hybrid Automatic Repeat Request (HARQ) retransmission protocol. In such cases incremental redundancy may be used by respectively selecting different sets of bits from the output bits of the encoder during the initial transmission and the following retransmission(s) for a given set of input bits. The different sets, denoted as redundancy versions and identified by a redundancy version number, may then be combined at the decoder, which effectively reduces the code rate and increases the coding gain. In such scenarios, the grouping of the resource elements may also depend on the currently utilized redundancy version. In particular, the grouping may depend on the redundancy version number. That is to say the grouping can be changed with each retransmission attempt.

For more detailed explanation of the exemplary implementations, the following designations will be used:

pipe_idx: index of pipe
NB: total number of PRB bundles in allocated bandwidth
Npipes: number of pipes
Nprb: number of PRBs per PRB bundle
Nsc: number of subcarriers per PRB
Nbundle(pipe_idx): number of PRB bundles in pipe pipe_idx
Nlayers: number of spatial layers Typically the number of PRB bundles per pipe is Nbundle (pipe_idx)=NB/Npipes for all pipe indices pipe_idx. However, if NB is not a multiple of Npipes, some pipes may also have less PRB bundles.

The number of pipes, Npipes, may be a function of the allocated bandwidth. For example, the number of pipes could be increased of more bandwidth is allocated to the UE 200. However, also utilization of a fixed number of pipes is possible.

In an exemplary implementation, the number of pipes could be determined according to:

$$Npipes = \left\lceil \frac{NP}{25} \right\rceil, \quad (1)$$

where NP is the total number of PRBs allocated to the UE 200. Alternatively, NP could be the system bandwidth, i.e., the total number of PRBs available for allocation to the UEs 200 in the cell.

The grouping of the PRB bundles to the pipes may be accomplished in such a way that PRB bundles which are neighboring in the frequency domain are assigned to different pipes. This is beneficial in view of frequency diversity.

For example, if the pipes are provided with indices $$p=0,1,2,\ldots,Npipes-1, \quad (2)$$

and the PRB bundles in the allocated bandwidth are provided with indices $$o=0,1,2,\ldots,NB-1 \quad (3)$$

according to the frequency position of the PRB bundle in the time-frequency grid of the subframe 20, the PRB bundle with index o could be associated to the pipe with index p if the condition $$(o+(Npipes-p)+Nstart)\bmod(Npipes)=0 \quad (4)$$

is met. The parameter Nstart may be fixed, e.g., Nstart=0. Alternatively, Nstart may be variable, e.g., dependent on a subframe number and/or a UE specific index. The latter option may for example be utilized for implementing the above-mentioned option of modifying the mapping depending on the subframe and/or on the redundancy version.

As mentioned above, the data symbols of the sequence $y^{(p)}(i)$ are consecutively mapped to the resource elements of one pipe, until the resource elements of the pipe are completely mapped, and then the process continues with consecutively mapping the data symbols of the sequence $y^{(p)}(i)$ to the resource elements of the next pipe, and so on.

Within the pipe, the mapping is accomplished in an OFDM symbol first manner, i.e., starting on the first OFDM symbol on a given subcarrier in a certain PRB bundle of the pipe, the OFDM symbol index s is incremented together with the index i of the data symbol in the sequence $y^{(p)}(i)$, until the last OFDM symbol of the subframe is reached (e.g., with index i=13). The process is then repeated, starting on the first OFDM symbol on another subcarrier in another PRB bundle of the same pipe. At some point, the process returns to a previously visited PRB bundle of the pipe, but will then start with the first OFDM symbol on another subcarrier of the PRB bundle.

Accordingly, the mapping process may cycle through the different OFDM symbols, then through the different PRB bundles, then through the different subcarriers within the PRB bundles until all resource elements of the pipe are mapped. Then the process may continue with the next pipe. In the following exemplary implementations of such nested cycling processes will be explained in more detail.

In a first exemplary implementation, the data symbols of the sequence $y^{(p)}(i)$ are read consecutively from the antenna port buffer and are mapped in a OFDM symbol first manner to the resource elements on a given subcarrier. Then the mapping continues in an OFDM symbol first manner on the resource elements on another subcarrier in another PRB bundle, and so on. In this implementation, the subcarrier within the PRB bundle with index b=0, 1, 2, . . . to which a certain data symbol of the sequence is mapped may be represented by a subcarrier index c=0, 1, 2, . . . given by:

$$c=((a+b) \times sc\_step) \bmod (Nprb \times Nsc), \quad (5)$$

where a=0, 1, 2, . . . is a subcarrier counter. The parameter sc_step controls a subcarrier offset when switching to the next PRB bundle of the pipe. The parameter sc_step should not be a prime factor of Nprb×Nsc. The mapping of modulation symbols may then be accomplished by increasing b first until all bundles are looped through and then a until all symbols are mapped in the pipe. This procedure is then successively repeated for the other pipes. A pseudo code for illustrating the mapping process of this implementation is shown in FIG. 7. Exemplary mappings which may be obtained by this mapping process are illustrated in FIGS. 8 and 9, in which f denotes the frequency dimension of the time-frequency grid and t denotes the time dimension of the time-frequency grid.

In the pseudo code of FIG. 7, the subframe buffer is designated by sf_buf(sc,s,p), with sc designating the subcarrier of the subframe, s designating the OFDM symbol of the subframe, and p designating the antenna port. The antenna port buffer is designated by ap_buf(i,p), with i designating the index of the data symbol in the sequence $y^{(p)}(i)$ and p designating an index of the utilized antenna port. Further, the array PDSCH_mask(sc,s), with sc designating the subcarrier of the subframe and s designating the OFDM symbol of the subframe, is used to indicate whether a certain resource element should be used for mapping (if the value of PDSCH_mask(sc,s) is larger than 1) or not (if the value of PDSCH_mask(sc,s) is less or equal to 1). For example, for certain resource elements writing to the subframe buffer sf_buf(sc,s,p) may be omitted because the resource elements are punctured, e.g., intended to be overwritten by another signal anyway, which may be indicated by the value of PDSCH_mask(sc,s) being equal to 1. In some cases, the resource elements may also be skipped in the mapping process, e.g., if they are intended to be used for transmitting reference signals, which may be indicated by the value of PDSCH_mask(sc,s) being equal to 0. In the latter case the data symbols would be rate matched according to the unavailability of the resource elements. The variable r indicates the read position for obtaining data symbols from the antenna port buffer. The variable e designates an absolute PRB bundle index within the allocated bandwidth.

The pseudo code illustrates the hierarchy of cycling through the OFDM symbols, PRB bundles, subcarriers, and finally pipes: In an inner loop (the "while s" loop) the mapping proceeds by mapping consecutive data symbols to resource elements with successively increasing OFDM symbol index, i.e., to resource elements which are consecutive in the time domain), while moving along the same frequency domain position, i.e., on the same subcarrier. The next outer loop (the "while b" loop), is used for cycling through the PRB bundles of the pipe. This is accomplished in such a way that each time the mapping proceeds to another PRB bundle, a previously unused subcarrier in this PRB bundle is selected. The next outer loop (the "while a" loop is used for cycling through the subcarriers within the different PRB bundles. The outermost loop (the "while pipe_idx" loop) is used for cycling through the different pipes.

Figure 8:
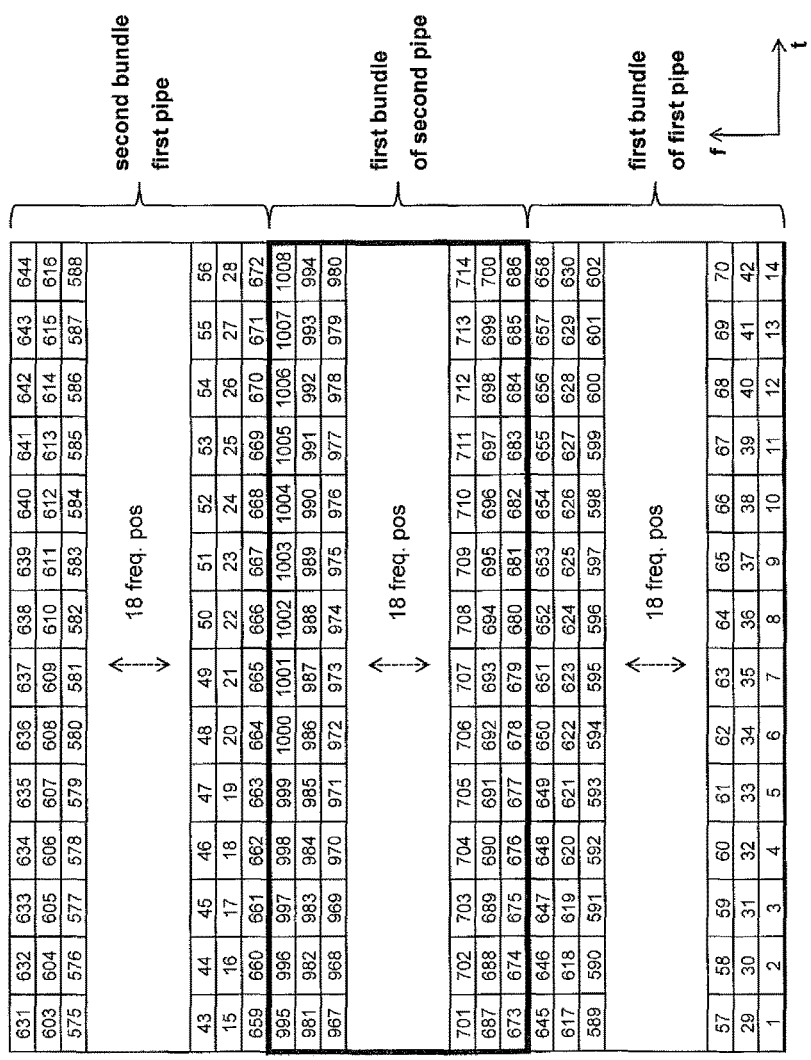
FIG. 8 schematically illustrates an exemplary resource element mapping which may be obtained by the process of FIG. 7.
Figure 9:
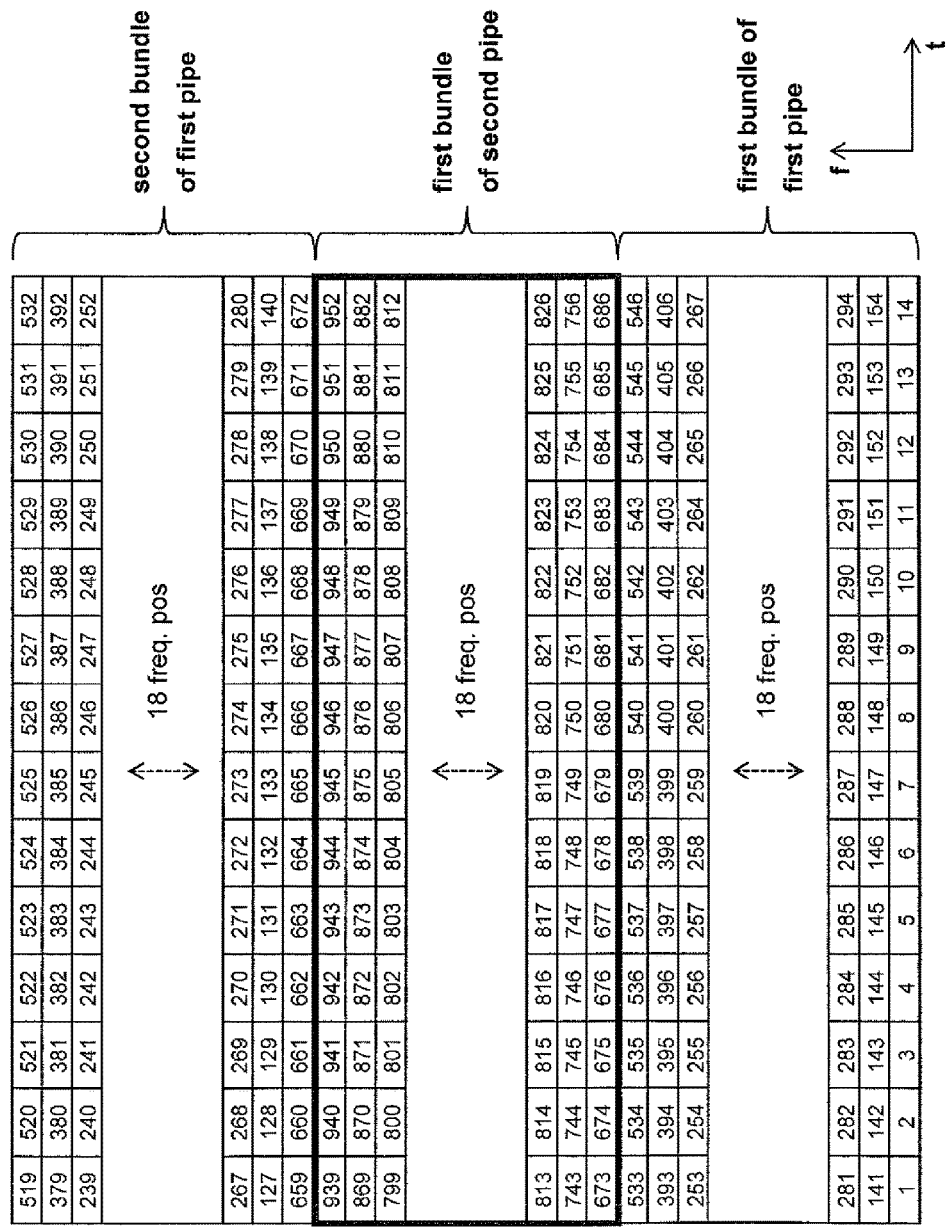
FIG. 9 schematically illustrates a further exemplary resource element mapping which may be obtained by the process of FIG. 7.

In the example of FIG. 8, two pipes with two PRB bundles in the first pipe and one PRB bundle in the second pipe are assumed. Each PRB bundle is assumed to include 24 subcarriers, which means that the total number of subcarriers, i.e., the total allocated bandwidth, is 72 subcarriers. The parameter sc_step is assumed to be sc_step=1. For simplifying the illustration, only one spatial layer is considered in the example of FIG. 8.

Also in the example of FIG. 9, two pipes with two PRB bundles in the first pipe and one PRB bundle in the second pipe are assumed, and each PRB bundle is assumed to include 24 subcarriers, which means that the total number of subcarriers, i.e., the total allocated bandwidth, is 72 subcarriers. As compared to the example of FIG. 8, the parameter sc_step is assumed to be sc_step=5. Again, only one spatial layer is considered. As can be seen, the larger value of the parameter sc_step enhances the spreading of the data symbols within the same PRB bundle.

In a second exemplary implementation, the data symbols of the sequence $y^{(p)}(i)$ are read consecutively from the antenna port buffer and are mapped in a OFDM symbol first manner to the resource elements which are consecutive in the time domain, however on different subcarriers. In particular, the subcarrier within the PRB bundle is varied together with the OFDM symbol index. Accordingly, a subcarrier shift is introduced with each step of the OFDM symbol index. Then the mapping continues in an OFDM symbol first manner on the resource elements in another PRB bundle, starting on another subcarrier, and so on. In this implementation, the subcarrier within the PRB bundle with index b=0, 1, 2, . . . to which a certain data symbol of the sequence is mapped may be represented by a subcarrier index c=0, 1, 2, . . . given by:

$$c=((a+b+s)\times sc\_step)\bmod(Nprb\times Nsc), \qquad (6)$$

where, similar to the above implementation, a=0, 1, 2, . . . is a subcarrier counter and the parameter sc_step controls a subcarrier offset when switching to the next PRB bundle of the pipe. The mapping of modulation symbols may then be accomplished by first increasing s until all OFDM symbols are looped through, then increasing b until all bundles are looped through, and then increasing a until all symbols are mapped in the pipe. This procedure is then successively repeated for the other pipes. A pseudo code for illustrating the mapping process of this implementation is shown in FIG. 10. An exemplary mapping which may be obtained by this mapping process is illustrated in FIG. 11, in which f denotes the frequency dimension of the time-frequency grid and t denotes the time dimension of the time-frequency grid.

The pseudo code of FIG. 10 uses the same designations as that of FIG. 7, but uses relation (6) for representing the index c of the subcarrier within the PRB bundle. Further, the loop structure reflects the modified way of looping through the subcarriers: In an inner loop (the "while s" loop) the mapping proceeds by mapping consecutive data symbols to resource elements with successively increasing OFDM symbol index, i.e., to resource elements which are consecutive in the time domain), shifting to another subcarrier with each new OFDM symbol. The next outer loop (the "while b" loop), is used for cycling through the PRB bundles of the pipe. This is accomplished in such a way that each time the mapping proceeds to another PRB bundle, a previously unused subcarrier in this PRB bundle is selected as a starting point for the mapping within the "while s" loop. The next outer loop (the "while a" loop is used for cycling through the subcarriers within the different PRB bundles. The outermost loop (the "while pipe_idx" loop) is used for cycling through the different pipes.

Figure 11:
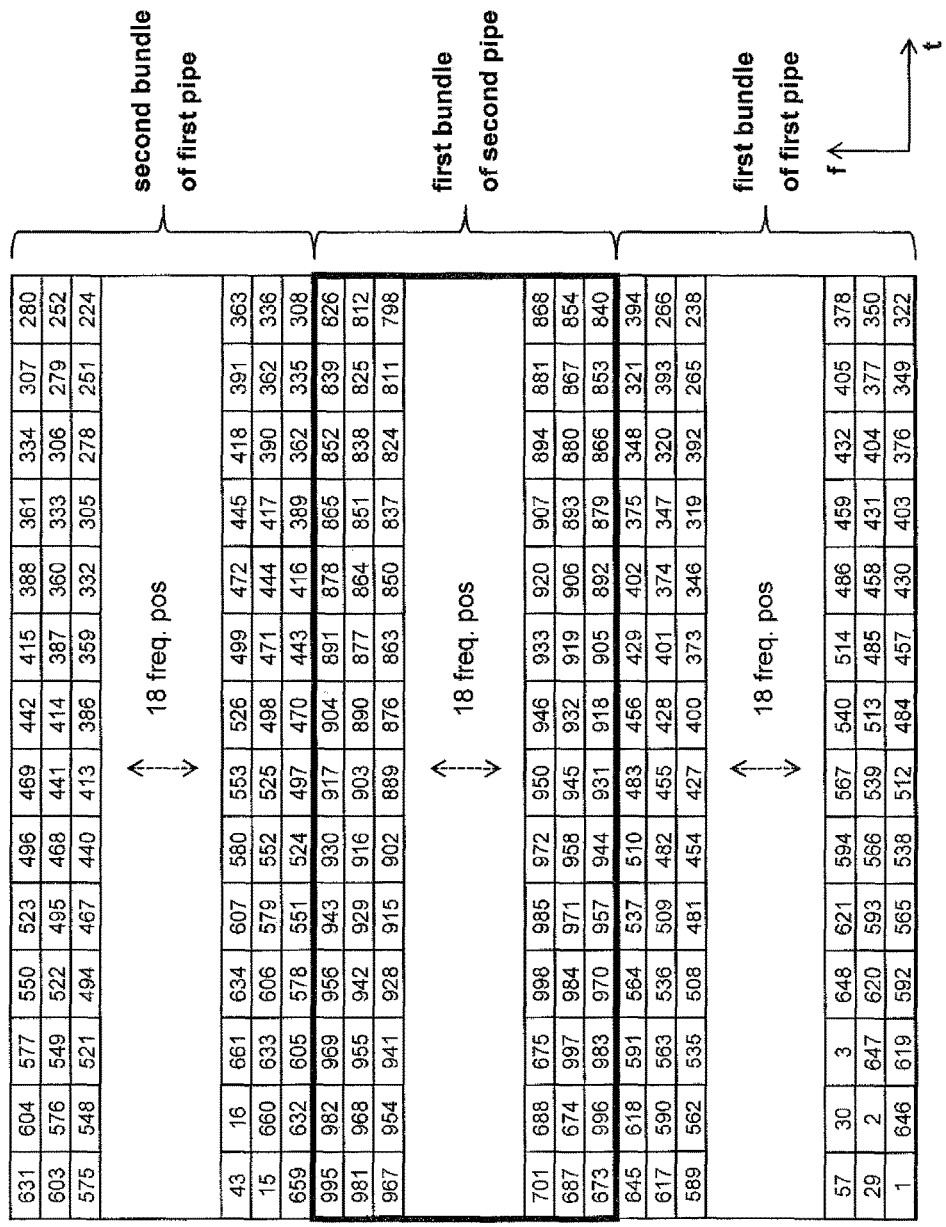
FIG. 11 schematically illustrates a further exemplary resource element mapping which may be obtained by the process of FIG. 10.

In the example of FIG. 11, two pipes with two PRB bundles in the first pipe and one PRB bundle in the second pipe are assumed. Each PRB bundle is assumed to include 24 subcarriers, which means the that the total number of subcarriers, i.e., the total allocated bandwidth, is 72 subcarriers. The parameter sc_step is assumed to be sc_step=1. For simplifying the illustration, only one spatial layer is considered in the example of FIG. 11. As compared to the example of FIG. 8, an spreading of the data symbols within the same PRB bundle can be observed. This spreading applies both to the frequency domain and to the time domain.

As can be seen, the mapping of the illustrated implementations allows for accomplishing the mapping of the data symbols $y^{(p)}(i)$ to the pipes in such a way that each code block is spread over multiple PRB bundles, e.g., over all PRB bundles of the pipe. Further, the mapping may also provide that each code block is spread over the different subcarriers within each PRB. In other words, the mapping may avoid that a single code block is mapped to the same subcarrier within the different pipes, e.g., to the j-th subcarrier of the first pipe and to the j-th subcarrier of the second pipe.

Further, the mapping operates in such a way that consecutive data symbols $y^{(p)}(i)$ are mapped to different OFDM symbols, i.e., to different time positions of the time-frequency grid. For example, the consecutive data symbols $y^{(p)}(i)$ may be mapped to resource elements of the time-frequency grid which are consecutive or otherwise distinct in the time domain.

Further, the above way of mapping the data symbols $y^{(p)}(i)$ to the resource elements of the time-frequency grid may be used to achieve a uniformly high frequency diversity for the code blocks transmitted in a subframe. This reduces differences in the likelihood of a transmission failure between the different code blocks. The frequency diversity may for example equalize the impact of interference on the different code blocks, so that all code blocks of a transport block are affected in a similar way by interference, e.g., interference caused by CRS transmission in a neighboring cell affecting certain subcarriers and OFDM symbols in a pattern that is the same for all PRBs in a given subframe. Accordingly, overall transmission performance can be improved.

Further, the above way of mapping the data symbols $y^{(p)}(i)$ to the resource elements of the time-frequency grid may have beneficial effects in the case of puncturing resource elements, e.g., by not transmitting certain resource elements or not considering certain resource elements in the reception process. For example, the mapping may ensure that a completely punctured OFDM symbol (i.e., punctured over all subcarriers of the subframe) will create punctured data symbols in all code blocks, and that the number of punctured data symbols is as substantially equal for the different code blocks. For example, such punctured OFDM symbols could be due to inserting a guard period when switching between DL and UL transmission in a Time Division Duplex (TDD) mode. Similarly, the mapping may ensure that a reoccurring resource element puncturing pattern that is identical in all allocated PRBs will create punctured OFDM symbols in all code blocks, and that the number of punctured data symbols will be substantially the same for all code blocks. For example, such reoccurring puncturing pattern could be due to certain resource elements being reserved for the transmission of UE-specific reference symbols.

Further, the introduction of the pipes, facilitates distribution of processing in the receiver over several parallelization instances. In particular, the parallelization in the receiver may be accomplished in such a way that the data symbols of a given pipe are processed by the same parallelization instance. For example, each of the different processing chains as explained in connection with FIG. 6 could be assigned to a corresponding pipe. In this way, the amount of information which needs to be exchanged between the processing chains can be limited or even completely avoided. Typically, exchange of information between the processing chains may only be needed in rare cases when a code block extends from one pipe to the next pipe.

Accordingly, if each parallelization instance performs processing of data emanating from a certain pipe, the processing in the receiver could be distributed in such a way that the same parallelization instance performs channel estimation, MIMO equalization, and decoding of code blocks with no or limited exchange of information or synchronization mechanisms between the different parallelization instances. As a consequence, resources in the receiver may be utilized more efficiently, the implementation of the receiver may be simplified, and/or latency may be reduced. This in turn helps to improve performance of the receiver and/or reduce development and manufacturing costs of the receiver.

Figure 12:
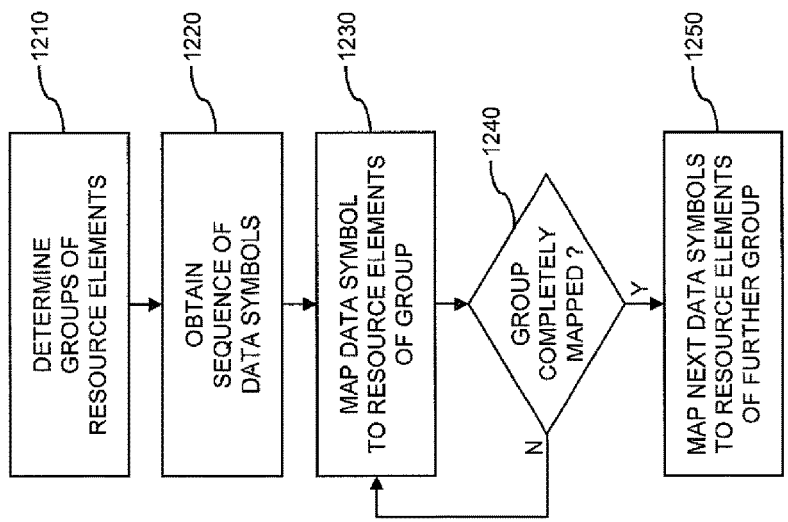
FIG. 12 shows a flowchart for illustrating a method of sending data according to an embodiment of the invention.

FIG. 12 shows a flowchart for illustrating a method of sending data which may be used for implementing the above concepts. As mentioned above, the sending of data is accomplished over a radio interface using subframes with a plurality of resource elements organized in a time-frequency grid, e.g., as explained in connection with FIGS. 1 and 2. The radio interface may for example be utilized in a cellular network, e.g., as illustrated in FIG. 3. The method of FIG. 12 may be implemented by a sender. When assuming a DL transmission in a cellular network, e.g., as illustrated in FIG. 3, the sender may correspond to a base station, e.g., to the base station 100. When assuming a UL transmission in a cellular network, e.g., as illustrated in FIG. 3, the sender may correspond to a UE, e.g., to one of the UEs 200. If a processor based implementation of the sender is used, the steps of the method may be performed by one or more processors of the sender. For this purpose, the processor(s) may execute correspondingly configured program code. Further, at least some of the corresponding functionalities may be hardwired in the processor(s).

At step 1210, at least two groups of resource elements are determined from the resource elements of one of the subframes. This is accomplished in such a way that each group covers multiple consecutive resource elements in the time domain and is distinct from the at least one other group in the frequency domain. As illustrated in the above examples, the groups may extend over substantially the entire subframe duration, however excluding a control region of the subframe which is typically not available for resource allocation. Typically, the groups are determined from the resource elements which are allocated to a certain receiver, i.e., from the above-mentioned allocated bandwidth.

The resource elements of each group may include at least one bundle of multiple consecutive resource elements in the time domain and frequency domain. For example, such bundle may correspond to a PRB bundle. As explained above, for purposes of channel estimation at a receiver, the receiver may be allowed to assume static precoding of reference symbols transmitted within the same bundle.

At least one of the groups may include two or more of the bundles, which are spaced apart from each other in the frequency domain. In this way, it can be avoided that the multiple bundles of the group cover a contiguous frequency region of the time-frequency grid, and frequency diversity can be improved. In the case of spaced apart bundles, at least one bundle of another one of the groups can be arranged between the spaced apart bundles.

Accordingly, the bundles of different groups may be interleaved. Examples of such interleaved bundles are illustrated in FIGS. 8, 9, and 11.

In some implementations, the bundles which are neighboring in the frequency domain are assigned to different groups. This may for example be accomplished using an algorithm as explained in connection with relation (4).

At step 1220, data to be sent are processed to obtain a sequence of data symbols. This processing may for example involve encoding of the data. For example, as explained in connection with FIG. 4 the encoding may provide a number of code blocks which are individually decodable. However, also other processing steps could be provided, e.g., rate matching, modulation, scrambling, spatial layer mapping, or the like. The processing may at least in part be performed in a parallelized manner, e.g., as explained in connection with FIG. 4.

At step 1230, the data symbols of the sequence are consecutively mapped to the resource elements of one of the groups.

In some implementations the mapping of the data symbols to the resource elements may involve that, within the same bundle, multiple consecutive data symbols of the sequence are mapped to resource elements on the same frequency grid position. An example of a corresponding mapping process is explained in connection with relation (5) and FIGS. 7 to 9, in which the data symbols are mapped in an OFDM symbol first manner to time-consecutive resource elements on the same subcarrier.

In some implementations the mapping of the data symbols to the resource elements may involve that, within the same bundle, the frequency grid positions of the resource elements to which the data symbols of the sequence are mapped differ between each pair of consecutive data symbols. An example of a corresponding mapping process is explained in connection with relation (6) and FIGS. 10 and 11, in which the data symbols are mapped in an OFDM symbol first manner to time-consecutive resource elements on different subcarriers.

In some implementations the mapping of the data symbols to the resource elements may involve that the frequency grid positions within the bundle of the resource elements to which the data symbols of the sequence are mapped differ between each pair of consecutive data symbols in different bundles. The frequency grid position within the bundle may for example be expressed in terms of a bundle-specific subcarrier index, such as the above mentioned subcarrier index c.

In some implementations the mapping of the data symbols to the resource elements may involve that, within the same bundle, multiple consecutive data symbols of the sequence are mapped to resource elements of the bundle which are consecutive in the time domain. As mentioned above, these time-consecutive resource elements may be on the same subcarrier or on different subcarriers.

For a group comprising at least two of the bundles, e.g., as illustrated in the examples of FIGS. 8, 9, and 11 for the first pipe, the mapping of the data symbols to the resource elements may involve that a first set of multiple consecutive data symbols of the sequence is mapped to first resource elements within a first one of the bundles which are consecutive in the time domain, a second set of multiple consecutive data symbols of the sequence is mapped to second resource elements within a second one of the bundles which are consecutive in the time domain, and a third set of multiple consecutive data symbols of the sequence is mapped to third resource elements within the first one of the bundles which are consecutive in the time domain and are located on other frequency grid positions than the first resource elements. Corresponding examples of mapping processes are explained in connection with relations (5) and (6) and further illustrated by FIGS. 7-11. Specifically, in these mapping processes the mapping is performed in an OFDM symbol first manner, looping through the OFDM symbol indices in a first one of the PRB bundles, the continues in a second PRB bundle, again in an OFDM symbol first manner, looping through the OFDM symbol indices of the second PRB bundle, and then returns to the first PRB bundle where the mapping in continued in an OFDM symbol first manner, looping through the OFDM symbol indices, however on different subcarrier indices.

At step 1240, it is checked if the resource elements of the group are completely mapped. If this is not the case, i.e., if there are unmapped resource elements left in the group, the method returns to step 1230 for continuing with the consecutive mapping, as indicated by branch "N". If the resource elements of the group are completely mapped, the method continues with step 1250, as indicated by branch "Y".

At step 1250, the next data symbols of the sequence are consecutively mapped to the resource elements of a further one of the groups. This may be accomplished by re-iterating the steps 1230 for each other group, until the resource elements of all groups have been mapped or no more data symbols are left to be mapped.

When the mapping of data symbols to the resource elements of the subframe is completed, the subframe may be generated accordingly and sent over the radio interface.

In some implementations, the mapping of the data symbols to the resource elements of the subframe may differ from a mapping of data symbols to resource elements in another one of the subframes. This may be accomplished by varying the grouping of the resource elements in step 1210 between the subframes, e.g., as mentioned in connection with relation (4). Further, the mapping of the data symbols to the resource elements of the subframe could also depend on a redundancy version of the encoded data, in particular a redundancy version number.

Figure 13:
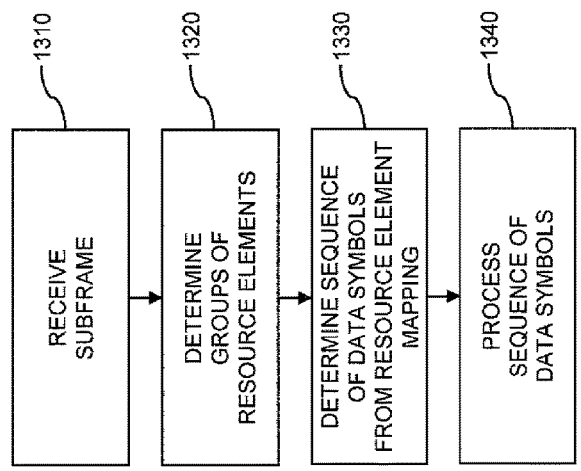
FIG. 13 shows a flowchart for illustrating a method of receiving data according to an embodiment of the invention.

FIG. 13 shows a flowchart for illustrating a method of receiving data which may be used for implementing the above concepts. As mentioned above, the receiving of data is accomplished over a radio interface using subframes with a plurality of resource elements organized in a time-frequency grid, e.g., as explained in connection with FIGS. 1 and 2. The radio interface may for example be utilized in a cellular network, e.g., as illustrated in FIG. 3. The method of FIG. 13 may be implemented by a receiver. When assuming a DL transmission in a cellular network, e.g., as illustrated in FIG. 3, the receiver may correspond to a UE, e.g., to one of the UEs 200. When assuming a UL transmission in a cellular network, e.g., as illustrated in FIG. 3, the receiver may correspond to a base station, e.g., to the base station 100. If a processor based implementation of the receiver is used, the steps of the method may be performed by one or more processors of the receiver. For this purpose, the processor(s) may execute correspondingly configured program code. Further, at least some of the corresponding functionalities may be hardwired in the processor(s).

At step 1310, receiving one of the subframes is received. This is accomplished over the above-mentioned radio interface.

At step 1320, at least two groups of resource elements are determined from the resource elements of one of the subframes. This is accomplished in such a way that each group covers multiple consecutive resource elements in the time domain and is distinct from the at least one other group in the frequency domain. As illustrated in the above examples, the groups may extend over substantially the entire subframe duration, however excluding a control region of the subframe which is typically not available for resource allocation. Typically, the groups are determined from the resource elements which are allocated to a certain receiver, i.e., from the above-mentioned allocated bandwidth.

The resource elements of each group may include at least one bundle of multiple consecutive resource elements in the time domain and frequency domain. For example, such bundle may correspond to a PRB bundle. As explained above, for purposes of channel estimation at a receiver, the receiver may be allowed to assume static precoding of reference symbols transmitted within the same bundle.

At least one of the groups may include two or more of the bundles, which are spaced apart from each other in the frequency domain. In this way, it can be avoided that the multiple bundles of the group cover a contiguous frequency region of the time-frequency grid, and frequency diversity can be improved. In the case of spaced apart bundles, at least one bundle of another one of the groups can be arranged between the spaced apart bundles. Accordingly, the bundles of different groups may be interleaved. Examples of such interleaved bundles are illustrated in FIGS. 8, 9, and 11.

In some implementations, the bundles which are neighboring in the frequency domain are assigned to different groups. This may for example be accomplished using an algorithm as explained in connection with relation (4).

At step 1330, at least one sequence of data symbols received in the resource elements of the groups is determined. When using parallel processing, there is a sequence of data symbols may be determined for each parallelization instance. This is accomplished in accordance with a mapping between the data symbols and the resource elements of the subframe. Here, it should be understood that this mapping should be complementary to a resource element mapping used for generating the subframe at a sender, e.g., to the mapping used in steps 1230 and 1250 of FIG. 12. Accordingly, the process of determining the sequence(s) of data symbols may also be referred to as "demapping". The receiver may become aware of the mapping by receiving corresponding information from the sender. Further, information about the utilized mapping could also be preconfigured in the receiver.

In some implementations the mapping of the data symbols to the resource elements may involve that, within the same bundle, multiple consecutive data symbols of the sequence are mapped to resource elements on the same frequency grid position. An example of a corresponding mapping process is explained in connection with relation (5) and FIGS. 7 to 9, in which the data symbols are mapped in an OFDM symbol first manner to time-consecutive resource elements on the same subcarrier.

In some implementations the mapping of the data symbols to the resource elements may involve that, within the same bundle, the frequency grid positions of the resource elements to which the data symbols of the sequence are mapped differ between each pair of consecutive data symbols. An example of a corresponding mapping process is explained in connection with relation (6) and FIGS. 10 and 11, in which the data symbols are mapped in an OFDM symbol first manner to time-consecutive resource elements on different subcarriers.

In some implementations the mapping of the data symbols to the resource elements may involve that the frequency grid positions within the bundle of the resource elements to which the data symbols of the sequence are mapped differ between each pair of consecutive data symbols in different bundles. The frequency grid position within the bundle may for example be expressed in terms of a bundle-specific subcarrier index, such as the above mentioned subcarrier index c.

In some implementations the mapping of the data symbols to the resource elements may involve that, within the same bundle, multiple consecutive data symbols of the sequence are mapped to resource elements of the bundle which are consecutive in the time domain. As mentioned above, these time-consecutive resource elements may be on the same subcarrier or on different subcarriers.

For a group comprising at least two of the bundles, e.g., as illustrated in the examples of FIGS. 8, 9, and 11 for the first pipe, the mapping of the data symbols to the resource elements may involve that a first set of multiple consecutive data symbols of the sequence is mapped to first resource elements within a first one of the bundles which are consecutive in the time domain, a second set of multiple consecutive data symbols of the sequence is mapped to second resource elements within a second one of the bundles which are consecutive in the time domain, and a third set of multiple consecutive data symbols of the sequence is mapped to third resource elements within the first one of the bundles which are consecutive in the time domain and are located on frequency grid positions than the first resource elements. Corresponding examples of mapping processes are explained in connection with relations (5) and (6) and further illustrated by FIGS. 7-11. Specifically, in these mapping processes the mapping is performed in an OFDM symbol first manner, looping through the OFDM symbol indices in a first one of the PRB bundles, the continues in a second PRB bundle, again in an OFDM symbol first manner, looping through the OFDM symbol indices of the second PRB bundle, and then returns to the first PRB bundle where the mapping in continued in an OFDM symbol first manner, looping through the OFDM symbol indices, however on different subcarrier indices.

In some implementations, the mapping of the data symbols to the resource elements of the subframe may differ from a mapping of data symbols to resource elements in another one of the subframes. This may be accomplished by varying the grouping of the resource elements between the subframes, e.g., as mentioned in connection with relation (4). Further, the mapping of the data symbols to the resource elements of the subframe could also depend on a redundancy version of data encoded to the data symbols, in particular a redundancy version number.

At step 1340, the data symbols of the sequence are processed to obtain received data. This processing may for example involve decoding of the data. For example, as explained in connection with FIG. 6 such decoding may involve decoding of individual of code blocks. However, also other processing steps could be provided, e.g., channel estimation, rate dematching, demodulation, descrambling, spatial layer demapping, or the like. The channel estimation may be performed on the basis of reference symbols received in the subframe, assuming static precoding of the reference symbols within the same bundle.

The processing may at least in part be performed in a parallelized manner, e.g., as explained in connection with FIG. 6.

In some implementations, parallelized processing may be implemented by providing, for each of the groups of resource elements, a corresponding processing chain for performing the processing of the data symbols. In accordance with the mapping of the data symbols to the groups, the received data symbols may then be consecutively provided to the respective processing chain. For example, each processing chain illustrated in FIG. 6 could be assigned to a corresponding pipe, and the data symbols of this pipe could be processed in this processing chain, thereby allowing to achieve parallelization with minimal amount of information exchange between different processing chains. Here, it is to be understood that a processing chain may also be assigned to multiple pipes. Further, multiple processing chains to be assigned to the same pipe, which however may require some additional exchange of information between these processing chains.

Figure 14:
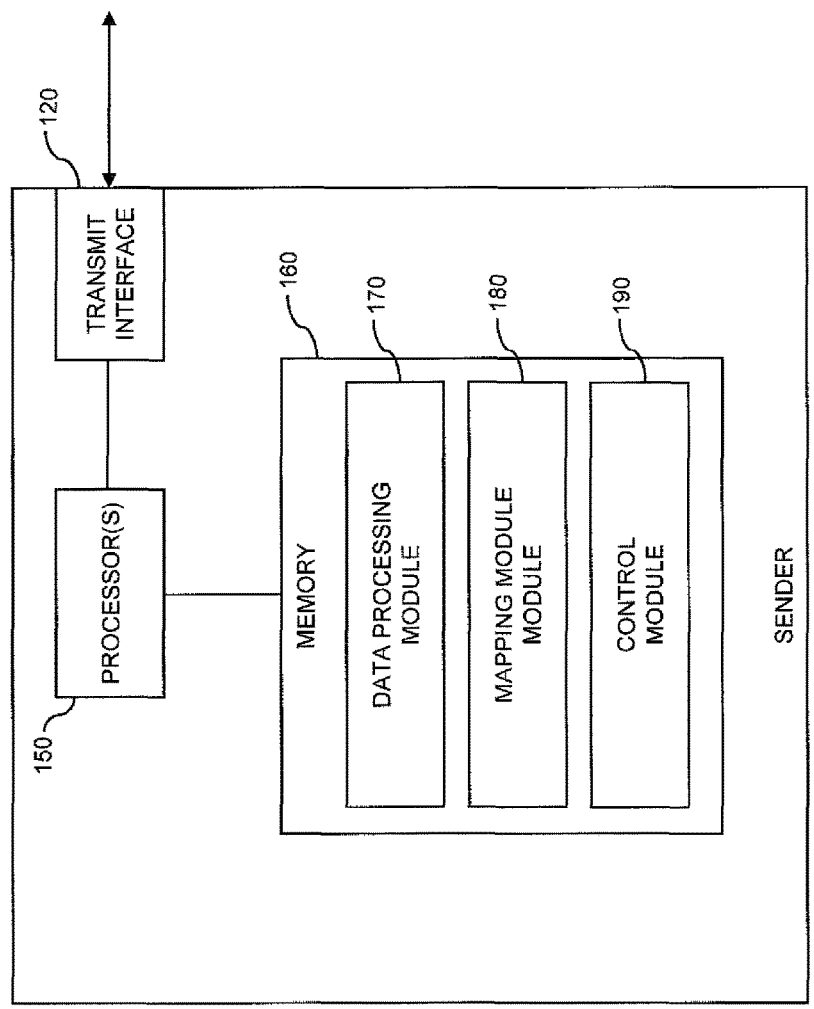
FIG. 14 schematically illustrates a device for a processor based implementation of a sender according to an embodiment of the invention.

FIG. 14 schematically illustrates a device for a processor based implementation of the sender. The device of FIG. 14 may for example correspond to the base station 100 (when assuming a DL transmission) or to one of the UEs 200 (when assuming a UL transmission).

In the illustrated example, the device includes a transmit interface 120. The transmit interface 120 is configured to support sending of subframes over the above-mentioned radio interface.

Further, the device includes one or more processor(s) 150 coupled to the interface 120 and a memory 160 coupled to the processor 150. The memory 160 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 160 includes suitably configured program code modules to be executed by the processor(s) 150 so as to implement the above-described functionalities of the sender. More specifically, the program code modules in the memory 160 may include a data processing module 170 so as to implement the above-described functionalities of processing data to be sent to obtain a sequence of data symbols, e.g., encoding, rate matching, scrambling, layer mapping. Further, the program code modules in the memory 160 may also include a mapping module 180 so as to implement the above-mentioned functionalities of mapping the data symbols of the sequence to the resource elements of the subframe, including the grouping of resource elements. Still further, the program code modules in the memory 160 may also include a control module 190 so as to implement general control functionalities, such as controlling the interface 120, performing allocation of resources of the subframe, sending control information to the receiver, managing retransmissions according to feedback from the receiver, or the like.

It is to be understood that the structure as illustrated in FIG. 14 is merely schematic and that the device may actually include further components which, for the sake of clarity, have not been illustrated, e.g., further interfaces such as an interface for obtaining the data to be sent. Also, it is to be understood that the memory 160 may include further types of program code modules, which have not been illustrated, e.g., program code modules for implementing known functionalities of a base station or UE. In some implementations, also a computer program may be provided for implementing functionalities of the sender, e.g., in the form of tangible product such as a non-transitory medium storing one or more of the program code modules to be stored in the memory 160 or by making one or more of the program code modules available for download.

Figure 15:
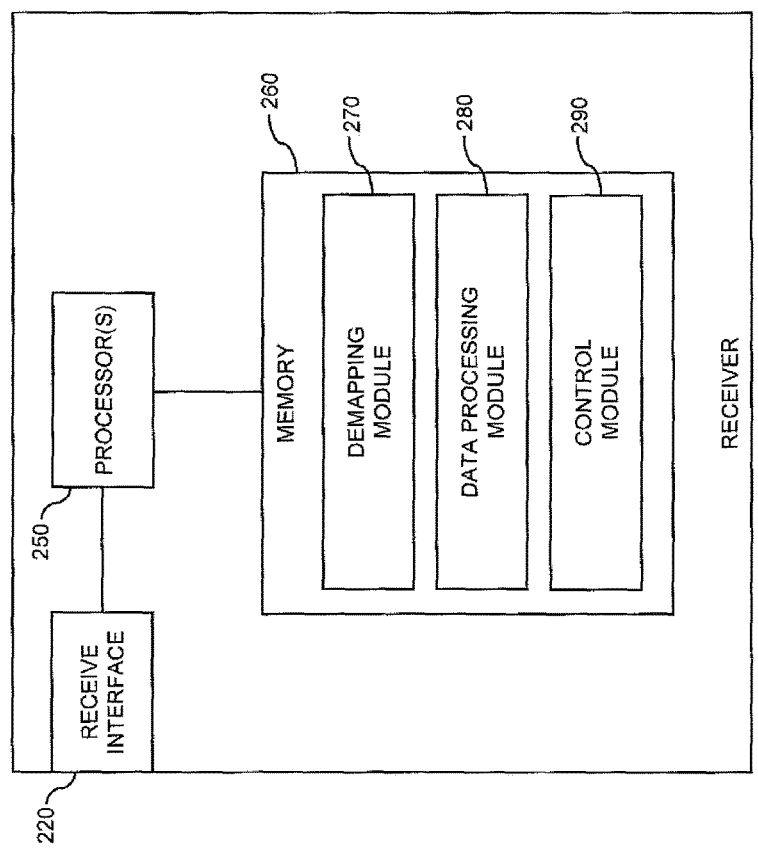
FIG. 15 schematically illustrates a device for a processor based implementation of a receiver according to an embodiment of the invention.

FIG. 15 schematically illustrates a device for a processor based implementation of the receiver. The device of FIG. 15 may for example correspond to one of the UEs 200 (when assuming a DL transmission) or to the base station 100 (when assuming a UL transmission).

In the illustrated example, the device includes a receive interface 220. The receive interface 220 is configured to support receiving of subframes over the above-mentioned radio interface.

Further, the device includes one or more processor(s) 250 coupled to the interface 220 and a memory 260 coupled to the processor 250. The memory 260 may include a ROM, e.g., a flash ROM, a RAM, e.g., a DRAM SRAM, a mass storage, e.g., a hard disk or solid state disk, or the like. The memory 260 includes suitably configured program code modules to be executed by the processor(s) 250 so as to implement the above-described functionalities of the receiver. More specifically, the program code modules in the memory 260 may include a demapping module 270 so as to implement the above-described functionalities of processing a received subframe to obtain a sequence of data symbols. Further, the program code modules in the memory 260 may also include a data processing module 280 so as to implement the above-mentioned functionalities of processing the data symbols of the sequence so as to obtain received data, e.g., by decoding. Further, the data processing module 270 may also implement functionalities for channel estimation, weight computation, MIMO equalization, softbit extraction, descrambling, rate dematching, or the like. Such processing may also be parallelized, e.g., by using multiple parallel threads on the same processor and/or by using multiple processors in parallel. Still further, the program code modules in the memory 260 may also include a control module 290 so as to implement general control functionalities, such as controlling the interface 220, sending feedback to the sender, or the like.

It is to be understood that the structure as illustrated in FIG. 15 is merely schematic and that the device may actually include further components which, for the sake of clarity, have not been illustrated, e.g., further interfaces such as an interface for obtaining the data to be sent. Also, it is to be understood that the memory 260 may include further types of program code modules, which have not been illustrated, e.g., program code modules for implementing known functionalities of a base station or UE. In some implementations, also a computer program may be provided for implementing functionalities of the receiver, e.g., in the form of tangible product such as a non-transitory medium storing one or more of the program code modules to be stored in the memory 260 or by making one or more of the program code modules available for download.

As can be seen, the concepts as described above may be used for efficient implementation of data transmission using subframes with resource elements which are organized in a time-frequency grid. Specifically, the mapping as used in the illustrated concepts allows for spreading data symbols over the resource elements of the subframe, thereby improving reliability and efficiency of transmission. Moreover, the mapping may help in facilitating parallelization of processing at the receiver.

It is to be understood that the examples and embodiments as explained above are merely illustrative and susceptible to various modifications. For example, the concepts could be used in connection with various types of radio technology which is based on a subframe structure with a time frequency grid. For example, the concepts could be applied in connection with other transmission modes than OFDM.

Moreover, it is to be understood that the above concepts may be implemented by using correspondingly designed software to be executed by one or more processors of an existing device, or by using dedicated device hardware. Also, the devices as described herein may be implemented by a single device or by a system of multiple component devices. For example, the above-mention base station of a cellular network distribution server could be implemented by system in which the illustrated functionalities are distributed over two or more devices. For example, the subframe generation, including the processing and mapping, could be implemented separately from a radio unit which sends the subframe over the radio interface.

What is claimed is:

1. A method of sending data over a radio interface using subframes with a plurality of resource elements organized in a time-frequency grid, the method comprising:

determining, from the resource elements of one of the subframes, at least two groups of resource elements, each group covering multiple consecutive resource elements in the time domain and multiple consecutive subcarriers in the frequency domain, such that the at least two groups are disjoint from each other, wherein the resource elements of each group comprise at least one bundle of multiple consecutive resource elements in the time domain and frequency domain, and at least one of the groups comprises two of the bundles which are spaced apart from each other in the frequency domain;

processing data to be sent to obtain a sequence of consecutive data symbols;

for each group, mapping the consecutive data symbols of non-adjacent, mutually disjoint sets of the sequence to the resource elements of respective subcarriers of the group across the time domain, such that the consecutive data symbols mapped to each of the respective subcarriers are non-adjacent to the consecutive data symbols mapped to each other of the respective subcarriers;

wherein for purposes of channel estimation at a receiver, the receiver is allowed to assume static precoding of reference symbols transmitted within the same bundle.

2. The method according to claim 1, wherein at least one bundle of another one of the groups is arranged between said spaced apart bundles.

3. The method according to claim 1, wherein the bundles which are neighboring in the frequency domain are assigned to different groups.

4. The method according to claim 1, wherein for a group comprising at least two of the bundles:

a first set of multiple consecutive data symbols of the sequence is mapped to first resource elements within a first one of the bundles which are consecutive in the time domain, a second set of multiple consecutive data symbols of the sequence is mapped to second resource elements within a second one of the bundles which are consecutive in the time domain, and a third set of multiple consecutive data symbols of the sequence is mapped to third resource elements within the first one of the bundles which are consecutive in the time domain and are located on different frequency grid positions than the first resource elements.

5. The method according to claim 1, wherein the mapping of the data symbols to the resource elements of the subframe differs from a mapping of data symbols to resource elements in another one of the subframes.

6. The method according to claim 1, wherein said processing of the data to be sent comprises encoding of the data.

7. The method according to claim 6, wherein the mapping of the data symbols to the resource elements of the subframe depends on a redundancy version of the encoded data.

8. A method of receiving data over a wireless interface using subframes with a plurality of resource elements organized in a time-frequency grid, the method comprising:
  receiving one of the subframes;
  determining, from the resource elements of the subframe, at least two groups of resource elements, each group covering multiple consecutive resource elements in the time domain and multiple consecutive subcarriers in the frequency domain, such that the at least two groups are disjoint from each other;
  determining a sequence of data symbols received in the resource elements of the groups in accordance with a mapping in which, for each group, consecutive data symbols of non-adjacent, mutually disjoint sets of the sequence are mapped to the resource elements of respective subcarriers of the group across the time domain, such that the consecutive data symbols mapped to each of the respective subcarriers are non-adjacent to the consecutive data symbols mapped to each other of the respective subcarriers, wherein the resource elements of each group comprise at least one bundle of multiple consecutive resource elements in the time domain and frequency domain, and at least one of the groups comprises two of the bundles which are spaced apart from each other in the frequency domain;
  processing the data symbols of the sequence to obtain received data; and
  performing channel estimation on the basis of reference symbols received in the subframe assuming static precoding of the reference symbols within the same bundle.

9. The method according to claim 8, comprising:
  for each of the groups of resource elements, providing a corresponding processing chain for performing said processing of the data symbols; and
  in accordance with the mapping of the data symbols to the groups, providing the received data symbols to the respective processing chain.

10. The method according to claim 1, wherein at least one bundle of another one of the groups is arranged between said spaced apart bundles.

11. The method according to claim 8, wherein the bundles which are neighboring in the frequency domain are assigned to different groups.

12. The method according to claim 8, wherein for a group comprising at least two of the bundles:
  a first set of multiple consecutive data symbols of the sequence is mapped to first resource elements within a first one of the bundles which are consecutive in the time domain,
  a second set of multiple consecutive data symbols of the sequence is mapped to second resource elements within a second one of the bundles which are consecutive in the time domain, and
  a third set of multiple consecutive data symbols of the sequence is mapped to third resource elements within the first one of the bundles which are consecutive in the time domain and are located on different frequency grid positions than the first resource elements.

13. The method according to claim 8, wherein the mapping of the data symbols to the resource elements of the subframe differs from a mapping of data symbols to resource elements in another one of the subframes.

14. The method according to claim 8, wherein the data are encoded in the data symbols and said processing of the data symbols comprises decoding of the data from the data symbols.

15. The method according to claim 14, wherein the mapping of the data symbols to the resource elements of the subframe depends on a redundancy version of the encoded data.

16. A device for sending data over a radio interface using subframes with a plurality of resource elements organized in a time-frequency grid, the device comprising:
  an interface for sending the subframes over the radio interface; and
  at least one processor, wherein the at least one processor is configured to:
  determine, from the resource elements of one of the subframes, at least two groups of resource elements, each group covering multiple consecutive resource elements in the time domain and multiple consecutive subcarriers in the frequency domain, such that the at least two groups are disjoint from each other, wherein the resource elements of each group comprise at least one bundle of multiple consecutive resource elements in the time domain and frequency domain, and at least one of the groups comprises two of the bundles which are spaced apart from each other in the frequency domain;
  process data to be sent to obtain a sequence of consecutive data symbols;
  for each group, map the consecutive data symbols of non-adjacent, mutually disjoint sets of the sequence to the resource elements of respective subcarriers of the group across the time domain, such that the consecutive data symbols mapped to each of the respective subcarriers are non-adjacent to the consecutive data symbols mapped to each other of the respective subcarriers;
  wherein for purposes of channel estimation at a receiver, the receiver is allowed to assume static precoding of reference symbols transmitted within the same bundle.

17. A device for receiving data over a radio interface using subframes with a plurality of resource elements organized in a time-frequency grid, the device comprising:
  an interface for receiving the subframes over the radio interface; and
  at least one processor, wherein the at least one processor is configured to:

receive one of the subframes;

determine, from the resource elements of the subframe, at least two groups of resource elements, each group covering multiple consecutive resource elements in the time domain and multiple consecutive subcarriers in the frequency domain, such that the at least two groups are disjoint from each other;

determine a sequence of data symbols received in the resource elements of the groups in accordance with a mapping in which, for each group, consecutive data symbols of non-adjacent, mutually disjoint sets of the sequence are mapped to the resource elements of respective subcarriers of the group across the time domain, such that the consecutive data symbols mapped to each of the respective subcarriers are non-adjacent to the consecutive data symbols mapped to each other of the respective subcarriers, wherein the resource elements of each group comprise at least one bundle of multiple consecutive resource elements in the time domain and frequency domain, and at least one of the groups comprises two of the bundles which are spaced apart from each other in the frequency domain;

process the data symbols of the sequence to obtain received data; and perform channel estimation on the basis of reference symbols received in the subframe assuming static precoding of the reference symbols within the same bundle.

18. A non-transitory, computer readable medium storing a computer program product comprising program instructions to be executed by at least one processor of a device for sending data over a radio interface using subframes with a plurality of resource elements organized in a time-frequency grid, wherein execution of the program instructions causes the at least one processor to:

determine, from the resource elements of one of the subframes, at least two groups of resource elements, each group covering multiple consecutive resource elements in the time domain and multiple consecutive subcarriers in the frequency domain, such that the at least two groups are disjoint from each other, wherein the resource elements of each group comprise at least one bundle of multiple consecutive resource elements in the time domain and frequency domain, and at least one of the groups comprises two of the bundles which are spaced apart from each other in the frequency domain;

process data to be sent to obtain a sequence of consecutive data symbols;

for each group, map the consecutive data symbols of non-adjacent, mutually disjoint sets of the sequence to the resource elements of respective subcarriers of the group across the time domain, such that the consecutive data symbols mapped to each of the respective subcarriers are non-adjacent to the consecutive data symbols mapped to each other of the respective subcarriers;

wherein for purposes of channel estimation at a receiver, the receiver is allowed to assume static precoding of reference symbols transmitted within the same bundle.

19. A non-transitory, computer readable medium storing a computer program product comprising program instructions to be executed by at least one processor of a device for receiving data over a radio interface using subframes with a plurality of resource elements organized in a time-frequency grid, wherein execution of the program instructions causes the at least one processor to:

receive one of the subframes;

determine, from the resource elements of the subframe, at least two groups of resource elements, each group covering multiple consecutive resource elements in the time domain and multiple consecutive subcarriers in the frequency domain, such that the at least two groups are disjoint from each other;

determining a sequence of data symbols received in the resource elements of the groups in accordance with a mapping in which, for each group, consecutive data symbols of non-adjacent, mutually disjoint sets of the sequence are mapped to the resource elements of respective subcarriers of the group across the time domain, such that the consecutive data symbols mapped to each of the respective subcarriers are non-adjacent to the consecutive data symbols mapped to each other of the respective subcarriers, wherein the resource elements of each group comprise at least one bundle of multiple consecutive resource elements in the time domain and frequency domain, and at least one of the groups comprises two of the bundles which are spaced apart from each other in the frequency domain;

process the data symbols of the sequence to obtain received data; and performing channel estimation on the basis of reference symbols received in the subframe assuming static precoding of the reference symbols within the same bundle.

* * * * *